UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF MAKING XANTHIN DERIVATIVES.

SPECIFICATION forming part of Letters Patent No. 569,489, dated October 13, 1896.

Application filed September 23, 1895. Serial No. 563,430. (No specimens.)

*To all whom it may concern:*

Be it known that I, EMIL FISCHER, a citizen of Germany, residing at Berlin, Germany, have invented a certain new and useful Art of Obtaining the Derivatives of Xanthin; and I do hereby declare the following to be a full, clear, and exact description of the invention, such as will enable others skilled in the art to which it appertains to make and use the same.

This invention relates to the art of obtaining derivatives of xanthin, such as theophyllin, caffein, and other homologues of xanthin; and it consists in forming such derivatives from alkyl derivatives of uric acid and such other methods, features, and steps, all as will be hereinafter described, and more particularly pointed out in the claims.

I have succeeded in obtaining from the alkyl derivatives of uric acid, which contain two alkyl radicals in the alloxan group and which have the structural arrangement or formula

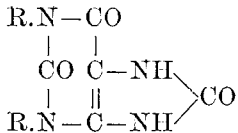

and by the aid of the pentachlorid or pentabromid of phosphorus reacting upon such alkyl derivatives, halogen compounds, which may easily be converted into homologues of xanthin by reduction—for example, by nascent hydrogen. When employing phosphorus pentachlorid, the reactions which take place under this treatment are indicated by the empirical equations 1. $C_5H_2R_2N_4O_3 + PCl_5 = POCl_3 + HCl + C_5HR_2ClN_4O_2$.
2. $C_5HR_2ClN_4O_2 + H_2 = C_5H_2R_2N_4O_2 + HCl$, the hydrogen in this case being employed as a reducing agent.

When dimethyl uric acid is employed, the reactions are expressed in the following structural equations:

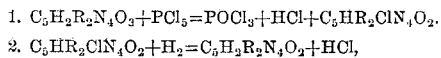
Dimethyl uric acid.   Chlorotheophyllin.

and

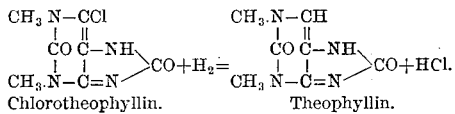
Chlorotheophyllin.   Theophyllin.

The resulting derivatives of xanthin may take up a third alkyl radical. If such xanthin derivative is theophyllin and the third alkyl radical taken up methyl, the theophyllin will be converted into caffein, as already known.

I have found that the above new compound, the chlorotheophyllin, may be converted into chlorocaffein, having the formula

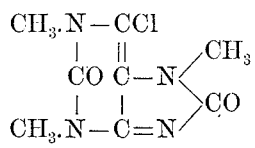

in a similar manner and even more readily than the chlorin-free base, theophyllin, is converted into caffein by the action of halogen compounds of methyl on the chlorotheophyllin. I am hence enabled, by combining the reactions outlined above, to proceed from dimethyl-uric acid to caffein, and in a similar or generically identical manner to prepare other di and tri alkyl derivatives of xanthin from alkyl derivatives of uric acid.

Example: For the preparation of theophyllin (dimethylxanthin) and caffein (trimethylxanthin) I start with dimethyl uric acid containing both methyl radicals in the alloxan group and whose formula has been given above. This dimethyl uric acid is prepared according to the method invented by Dr. Ach and myself and disclosed in *Sitzungsberichte der Akademie der Wissenschaften*, Berlin, 1895, page 171, said method consisting essentially in the action of dehydrating agents upon dimethylpseudo uric acid. The dimethyl uric acid is finely powdered and heated to about 150° centigrade, together with double the quantity of phosphorus pentachlorid and four times its quantity of oxychlorid of phosphorus in a closed vessel or tube and retained at this temperature for about one hour, during which time the bulk of the dimethyl uric acid will enter into solution, the crystallization of the newly-formed resulting chlorotheophyllin beginning soon afterward.

The reaction is completed after heating for from two to three hours. The crystalline mass which is formed is separated from the mother liquor after cooling and purified by recrystallizing from alcohol. This chlorotheophyllin melts at about 300° centigrade, the melting of the same being attended by decomposition. It is readily soluble in hot alcohol, somewhat more sparingly soluble in acetone, and soluble only with difficulty in chloroform. In a similar manner I obtain a mixture of chlorotheophyllin and bromotheophyllin, if in lieu of the phosphorus pentachlorid I employ phosphorus pentabromid and again use phosphorus oxychlorid as the solvent. This halogen compound of theophyllin, which may be either chlorotheophyllin or the mixture of chlorotheophyllin and bromotheophyllin or of pure bromotheophyllin, I convert into the chlorin-free base by reducing agents or methods, which may be of any suitable or desired character. Thus I may dissolve the halogen compound of theophyllin in hydrochloric acid and heat the solution, together with zinc, iron, or tin, or I may dissolve the same in hydroiodic acid and remove the free iodin as it is liberated by phosphonium iodid or by metals or other substance having sufficient affinity for the same. From this acid solution I separate the theophyllin, according to usual methods, by evaporation and neutralization by means of ammonia with subsequent separation and purification by recrystallizing from water or alcohol.

The artificial product is the same in every respect as the constituent or principle of tea, discovered by Kossel. (See *Zeitschrift für Physiologische Chemie*, 13, 198.)

To obtain chlorocaffein from chlorotheophyllin, I make use of the methylating methods. For example, I may produce the silver salt of the chlorotheophyllin and heat the same with iodid of methyl. This silver salt of chlorotheophyllin, which crystallizes in fine needles and is almost insoluble in water and which has the formula

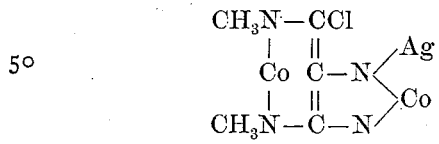

may be prepared by dissolving chlorotheophyllin in an aqueous solution of ammonia and adding to such solution a solution of nitrate of silver in excess, and then a sufficient quantity of strong ammonia, until the resulting voluminous precipitate is redissolved. The ammonia is then driven off by heating, whereupon the silver salt precipitates out in the form of fine colorless needles. This silver salt is heated to 100° centigrade, with iodid of methyl and maintained at this temperature for about twenty hours, whereupon an almost complete decomposition takes place, iodid of silver and chlorocaffein being concurrently formed. This reaction is expressed in the following equation:

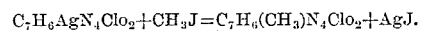

The chlorocaffein thus obtained is separated with the greatest facility from the iodid of silver by hot water or alcohol. Instead of the silver salt and the iodid of methyl I may employ the lead salt and the chlorid or bromid of methyl by slightly modifying the process. The chlorocaffein so obtained may with the greatest ease be converted into caffein by nascent hydrogen or other reducing agents, as is already sufficiently known. In the same manner the mixture of chlorotheophyllin and bromotheophyllin and bromotheophyllin alone may be converted into the corresponding caffein derivatives and thence into caffein.

Analogous derivatives of xanthin of the type of theophyllin and caffein and their halogen derivatives may be obtained under my invention in the same manner from other dialkyl uric acids, such as, *e. g.*, ethylmethyl uric acid or diethyl uric acid containing the alkyl radicals in the alloxan group. The products so obtained are to be employed in the same manner as caffein for therapeutic purposes or as alimentary substances.

While I have herein described the process of obtaining the trialkyl derivatives of xanthin in addition to the method of preparing the dialkyl derivatives of xanthin, I do not herein specifically claim such process, since the same forms the subject-matter of my application for Letters Patent of the United States, filed May 18, 1896, Serial No. 592,049. The same has been described here merely as an additional illustration of the present invention, which, considered broadly, consists in producing alkyl derivatives of xanthin, such as its homologues, from dialkyl uric acid.

The bromotheophyllin hereinbefore referred to may be made under the process set forth in my application filed of even date herewith, Serial No. 563,428, and which is as follows:

One part finely-powdered theophyllin which has been dried is heated with five parts bromin to 100° centigrade and maintained at that temperature for several hours in a tightly-closed vessel. The excess of bromin is thereupon removed and the contents of the vessel are heated to 150° centigrade and maintained at that temperature until all free bromin has escaped. The residue is then comminuted and treated with aqueous sulfurous acid in excess and gently heated to completely decolorize the same. The crude bromotheophyllin is then completely purified by dissolving in lye and treating with animal charcoal. The product is then precipitated out of the lye-bath by acid and the precipitate is then recrystallized from alcohol.

I do not herein claim the chlorotheophyllin or the process of obtaining the same, inasmuch as the same form the subject-matter of my application filed of even date herewith, Serial No. 563,429; nor do I claim herein the bromotheophyllin or the process of obtaining the same, having made them the subject-matter of my application filed of even date herewith, Serial No. 563,428.

As will be seen from the above, the methods of carrying out my invention may be very considerably varied without departing from said invention, which, in a broad sense, resides in the treatment of dialkyl uric acid with a halogen compound of phosphorus in the presence of a solvent, and in the subsequent conversion of the resulting halogen derivative into the homologues of xanthin.

The term "pentahalogen compound of phosphorus," employed in the claims, is used to designate a compound containing in each molecule five atoms of a halogen element to one atom of phosphorus, such as $PCl_5$ or $PBr_5$.

What I claim, and desire to secure by Letters Patent, is—

1. The process which consists in treating dialkyl uric acid with halogen compounds of phosphorus, for the purpose of converting the same into halogen derivatives of alkylized xanthin.

2. The process which consists in treating dialkyl uric acid with a pentahalogen compound of phosphorus in the presence of a solvent of the dialkyl uric acid.

3. The process which consists in treating dialkyl uric acid with a pentahalogen compound of phosphorus in the presence of phosphorus oxychlorid.

4. The process which consists in treating dialkyl uric acid with a pentahalogen compound of phosphorus in the presence of a solvent such as phosphorus oxychlorid, and then treating the resulting halogen derivatives with reducing agents to convert them into homologues of xanthin.

5. The process which consists in treating a halogen derivative of xanthin with a reducing agent to convert the same into a homologue of xanthin.

6. The process which consists in treating a halogen compound of a dialkyl derivative of xanthin with a reducing agent to convert the same into a homologue of xanthin of the type of theophyllin.

7. The process which consists in treating dialkyl uric acid with a pentahalogen compound of phosphorus in the presence of a solvent of the dialkyl uric acid, then converting the resulting halogen dialkyl derivative into a homologue of xanthin by a reducing agent.

In testimony whereof I affix my signature in presence of two witnesses.

EMIL FISCHER.

Witnesses:
OSCAR EMMERLING,
P. REHLÄNDER.